US012659300B2

(12) United States Patent
Patel et al.

(10) Patent No.: US 12,659,300 B2
(45) Date of Patent: Jun. 16, 2026

(54) CUSTOMER-MANAGED IDENTIFIER ROTATION AND ANONYMOUS PROCESSING

(71) Applicant: Google LLC, Mountain View, CA (US)

(72) Inventors: Dev Narendrabhai Patel, Ahmedabad (IN); Jacques Mouton, Tampa, FL (US); Benjamin Steven Kaplan, Los Angeles, CA (US); Frankie Lamar, Jr., New York, NY (US); Radhika Ravindranath, South Plainfield, NJ (US)

(73) Assignee: GOOGLE LLC, Mountain View, CA (US)

( * ) Notice: Subject to any disclaimer, the term of this patent is extended or adjusted under 35 U.S.C. 154(b) by 171 days.

(21) Appl. No.: 18/584,372

(22) Filed: Feb. 22, 2024

(65) Prior Publication Data

US 2025/0274441 A1     Aug. 28, 2025

(51) Int. Cl.
H04L 9/40          (2022.01)
(52) U.S. Cl.
CPC ................................ H04L 63/0421 (2013.01)
(58) Field of Classification Search
CPC .................................................. H04L 63/0421
USPC .......................................................... 726/24
See application file for complete search history.

(56) References Cited

U.S. PATENT DOCUMENTS

| | | | | |
|---|---|---|---|---|
| 8,666,812 | B1 * | 3/2014 | Gandhi | G06Q 30/02 705/14.52 |
| 9,465,668 | B1 * | 10/2016 | Roskind | H04L 67/34 |
| 11,019,103 | B2 | 5/2021 | Motukuru et al. | |
| 2003/0188171 | A1 * | 10/2003 | DeCenzo | H04N 21/441 713/185 |
| 2011/0078775 | A1 * | 3/2011 | Yan | G06F 21/57 726/5 |
| 2017/0228935 | A1 * | 8/2017 | Foster | G06F 3/011 |
| 2019/0020641 | A1 * | 1/2019 | Wasily | G06F 21/44 |

(Continued)

FOREIGN PATENT DOCUMENTS

CN             110224837             9/2019

OTHER PUBLICATIONS

Clock, "Zero-Knowledge Proofs: Non-Techie's Guide to Online Privacy Tech", Dec. 8, 2023, https://www.dock.io/post/zero-knowledge-proofs#:~:text=Zero%2DKnowledge%20Proofs%20enable%20interoperability,platforms%20in%20a%20secure%20manner.&text=ZKPs%20can%20be%20used%20to%20help%20with%20identity%20verification%20by,access%20to%20their%20actual%20data, retrieved on Feb. 22, 2024, 32 pages.

*Primary Examiner* — Michael S McNally
(74) *Attorney, Agent, or Firm* — DORITY & MANNING, P.A.

(57)                    ABSTRACT

Example embodiments of the present disclosure provide for an example method including establishing a computing environment accessible to a second computing system. The computing environment can include an anonymous identifier management tool. A first anonymous identifier associated with the second computing system can be established. Message data is exchanged from the computing environment to a first computing system. The message data can be associated with the first anonymous identifier without revealing a non-anonymous identifier associated with the first computing system. The anonymous identifier management tool can periodically update the first anonymous identifier to a second anonymous identifier. The first anonymous identifier and mapping data associating the first anonymous identifier and the second anonymous identifier is deleted.

15 Claims, 5 Drawing Sheets

(56) References Cited

U.S. PATENT DOCUMENTS

| 2019/0130133 | A1* | 5/2019 | Al-Kabra | ................ | H04L 69/22 |
| 2021/0304592 | A1* | 9/2021 | Lepp | ...................... | H04W 4/40 |

* cited by examiner

400

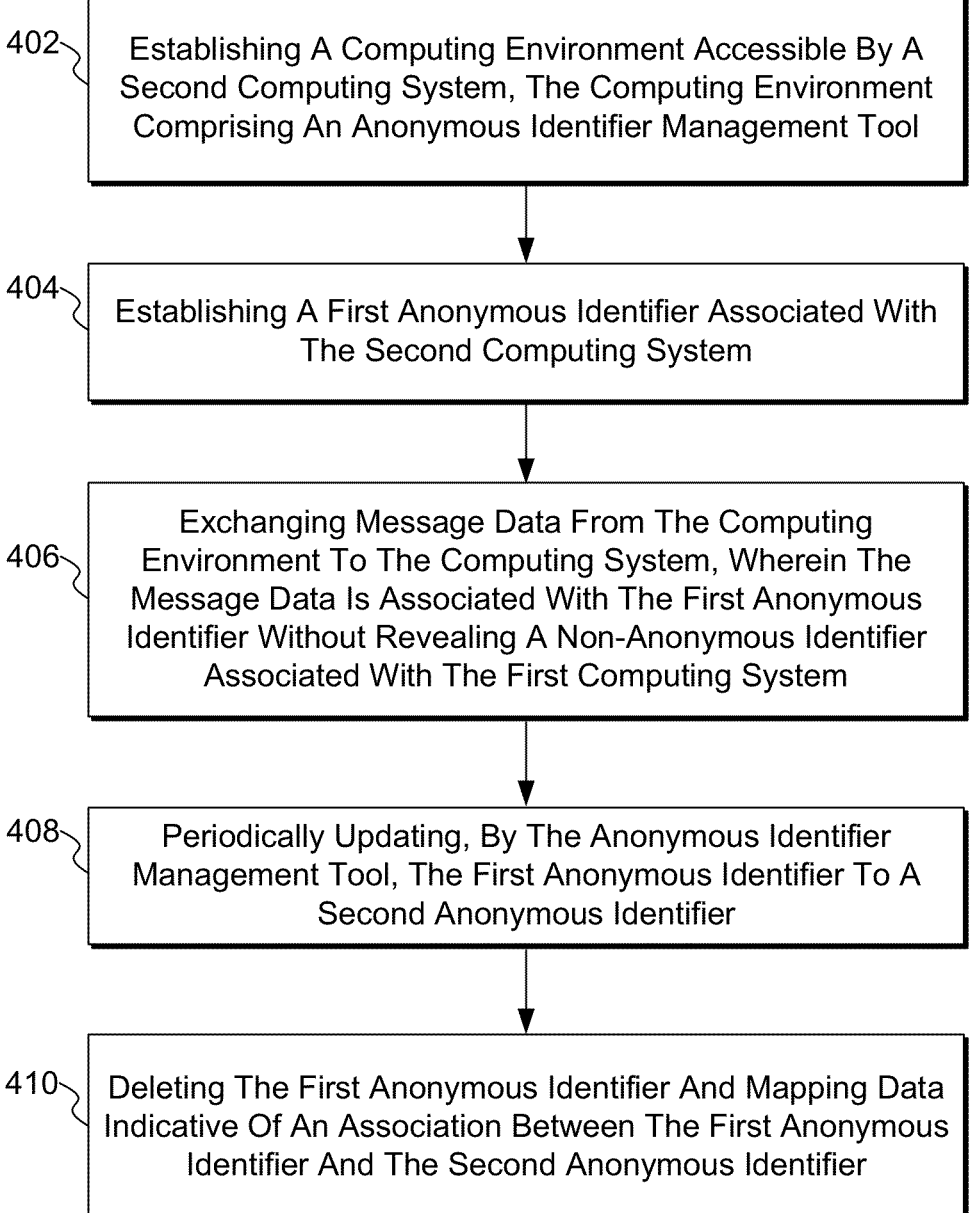

402 — Establishing A Computing Environment Accessible By A Second Computing System, The Computing Environment Comprising An Anonymous Identifier Management Tool 404 — Establishing A First Anonymous Identifier Associated With The Second Computing System 406 — Exchanging Message Data From The Computing Environment To The Computing System, Wherein The Message Data Is Associated With The First Anonymous Identifier Without Revealing A Non-Anonymous Identifier Associated With The First Computing System 408 — Periodically Updating, By The Anonymous Identifier Management Tool, The First Anonymous Identifier To A Second Anonymous Identifier 410 — Deleting The First Anonymous Identifier And Mapping Data Indicative Of An Association Between The First Anonymous Identifier And The Second Anonymous Identifier

FIG. 4

CUSTOMER-MANAGED IDENTIFIER ROTATION AND ANONYMOUS PROCESSING

FIELD

The present disclosure generally relates to customer-managed identifier rotation and anonymous processing. More particularly, the present disclosure relates to anonymous identifier management tools used in a cloud computing environment to provide a client computing system access to an anonymous identifier management tool to rotate anonymous identifiers to allow for anonymous processing.

BACKGROUND

Computing provider systems such as cloud computing provider systems can provide access to services for computing systems that have accounts or identifiers associated with the system. Current systems can provide for provider-managed pseudonyms for the accounts which are tied to client identifiers. Cloud computing providers can have thousands or millions of client identifiers associated with services.

SUMMARY

Aspects and advantages of embodiments of the present disclosure will be set forth in part in the following description, or can be learned from the description, or can be learned through practice of the embodiments.

In some aspects, the present disclosure provides for an example computer-implemented method for customer-managed identifier rotation and anonymous processing. The example method includes establishing, by the computing system, a computing environment accessible by a second computing system, the computing environment comprising an anonymous identifier management tool. The example method includes establishing, by the anonymous identifier management tool, a first anonymous identifier associated with the second computing system. The example method includes exchanging message data from the computing environment to the computing system, wherein the message data is associated with the first anonymous identifier without revealing a non-anonymous identifier associated with the second computing system. The example method includes periodically updating, by the anonymous identifier management tool, the first anonymous identifier to a second anonymous identifier. The example method includes deleting, by the anonymous identifier management tool, the first anonymous identifier and mapping data indicative of an association between the first anonymous identifier and the second anonymous identifier.

In some aspects, the present disclosure provides for an example computing system for malicious domain monitoring and filtering using drift monitoring and contextual data including one or more processors and one or more memory devices storing instructions that are executable to cause the one or more processors to perform operations. In some implementations the one or more memory devices can include one or more transitory or non-transitory computer-readable media storing instructions that are executable to cause the one or more processors to perform operations. In the example system, the operations can include establishing, by the computing system, a computing environment accessible by a second computing system, the computing environment comprising an anonymous identifier management tool. The operations can include establishing, by the anonymous identifier management tool, a first anonymous identifier associated with the second computing system. The operations can include exchanging message data from the computing environment to the computing system, wherein the message data is associated with the first anonymous identifier without revealing a non-anonymous identifier associated with the second computing system. The operations can include periodically updating, by the anonymous identifier management tool, the first anonymous identifier to a second anonymous identifier. The operations can include deleting, by the anonymous identifier management tool, the first anonymous identifier and mapping data indicative of an association between the first anonymous identifier and the second anonymous identifier.

In some aspects, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include establishing, by the computing system, a computing environment accessible by a second computing system, the computing environment comprising an anonymous identifier management tool. The operations can include establishing, by the anonymous identifier management tool, a first anonymous identifier associated with the second computing system. The operations can include exchanging message data from the computing environment to the computing system, wherein the message data is associated with the first anonymous identifier without revealing a non-anonymous identifier associated with the second computing system. The operations can include periodically updating, by the anonymous identifier management tool, the first anonymous identifier to a second anonymous identifier. The operations can include deleting, by the anonymous identifier management tool, the first anonymous identifier and mapping data indicative of an association between the first anonymous identifier and the second anonymous identifier.

BRIEF DESCRIPTION OF THE DRAWINGS

Detailed discussion of embodiments directed to one of ordinary skill in the art is set forth in the specification, which makes reference to the appended figures, in which:

FIG. 4 depicts a flow chart of an example method for customer-managed identifier rotation and anonymous processing according to example embodiments of the present disclosure.

DETAILED DESCRIPTION

The present disclosure provides for customer-managed identifier rotation and anonymous processing. More particularly, this disclosure relates to the generation of a computing environment within which a party can manage anonymous identifier rotation such that exchanges that exit the computing environment are associated with an anonymous identifier opposed to a non-anonymous identifier of the party. The rotation can include generation of new anonymous identifiers and destruction of old anonymous identifiers. In current multi-party computing environments, service providers are unable to process service requests in an anonymous manner without requiring a user's non-anonymous identifier. While current systems can assign pseudonyms to account identifiers, these are managed on the server side and thus cannot provide anonymity. The present disclosure solves this problem by providing control to the client entity over managing anonymous identifiers used to access services.

Anonymity for a customer is achieved by a service provider providing a computing environment (e.g., a set of nodes that run containerized applications, virtual machines, computing containers) for the customer that is managed by the customer. Within the computing environment, the customer can generate an anonymous identifier that can be authenticated (e.g., using a zero-knowledge proof). This infrastructure can allow for a cloud services customer to maintain anonymity within the cloud computing system by rotating the customer's own anonymous identifier. The anonymous identifier can be rotated at a regular interval or can be changed responsive to a non-anonymous identifier of a customer being revealed (e.g., via a break glass procedure, requiring reveal to reach a resolution). Revelation of a non-anonymous identifier can involve a procedure that occurs within the computing environment managed by the customer such that the non-anonymous identifier is not revealed to the cloud service provider. Preventing the revelation of the non-anonymous identifier outside the computing environment can be achieved using a zero-knowledge proof to authenticate the anonymous identifier. The zero-knowledge proof allows for the anonymous identifier to prove to the authenticator that the anonymous identifier is associated with a non-anonymous identifier. Thus, allowing the anonymous identifier to share proof that the anonymous identifier is associated with a non-anonymous identifier without revealing the non-anonymous identifier to the authenticator.

Following a revelation of the non-anonymous identifier of a customer, a new anonymous identifier can be generated and associated with relevant data associated with the first anonymous identifier without creating a trace between the first anonymous identifier and the new anonymous identifier.

With reference now to the figures, example embodiments of the present disclosure will be discussed in further detail.

Figure 1:
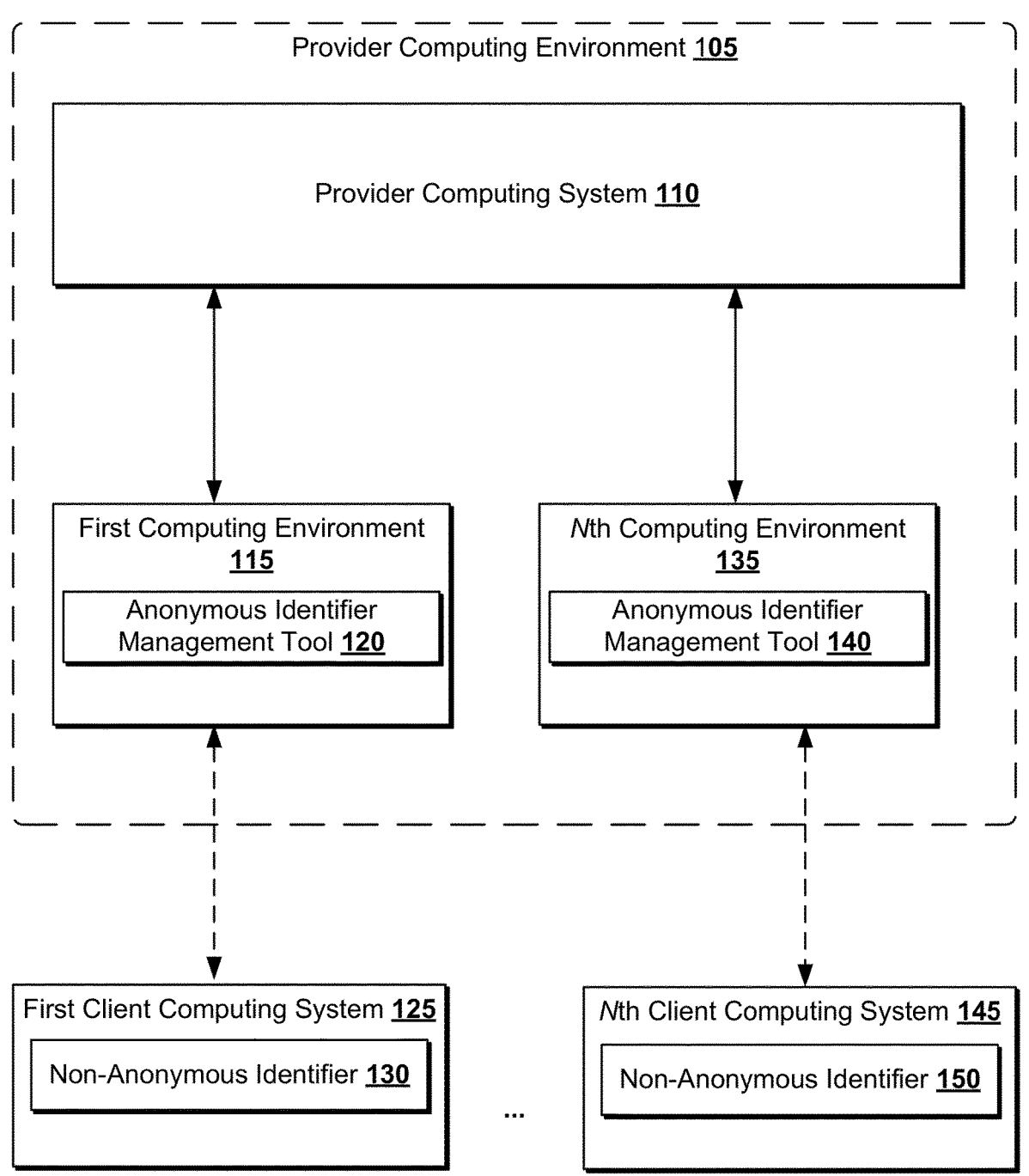
FIG. 1 depicts a block diagram of an example system for customer-managed identifier rotation and anonymous processing according to example embodiments of the present disclosure.

FIG. 1 depicts a block diagram of an example computing system. For instance, the computing system can include a provider computing environment 105. The provider computing environment can include provider computing system 110 and a number of additional computing environments. For instance, the number of additional computing environments can include a first computing environment 115 and an Nth computing environment 135.

The first computing environment 115 can be structurally hosted within the provider computing environment 105 but can be managed by first client computing system 125. Additionally, or alternatively, the first computing environment 115 can be structurally hosted by the associated first client computing system 125. For instance, first client computing system 125 can be associated with a non-anonymous identifier 130. The first client computing system 125 can interact with an anonymous identifier management tool 120 within the first computing environment to manage anonymous identifier rotation. The anonymous identifier management tool 120 can adjust the anonymous identifier such that the provider computing system 110 cannot determine the non-anonymous identifier 130 associated with the system. The manner in which this is accomplished will be discussed further with regard to FIG. 2.

The Nth computing environment 135 can be structurally hosted within the provider computing environment 105 but can be managed by the Nth client computing system 145. Additionally, or alternatively, the Nth computing environment 135 can be structurally hosted by the associated first client computing system 125. For instance, Nth client computing system 145 can be associated with a non-anonymous identifier 150. The Nth client computing system 145 can interact with an anonymous identifier management tool 140 within the first computing environment to manage anonymous identifier rotation. The anonymous identifier management tool 140 can adjust the anonymous identifier such that the provider computing system 110 cannot determine the non-anonymous identifier 150 associated with the Nth client computing system 145.

In some instances, the anonymous identifier management tool 120 and anonymous identifier management tool 140 can rotate anonymous identifiers at a regular cadence. In some instances, the anonymous identifiers can be rotated or otherwise changed based on a need to reveal or authenticate a client computing system's non-anonymous identifier. The anonymous identifier can be authenticated without revealing the associated non-anonymous identity through methods described herein, including, for example zero-knowledge proofs.

Figure 2:
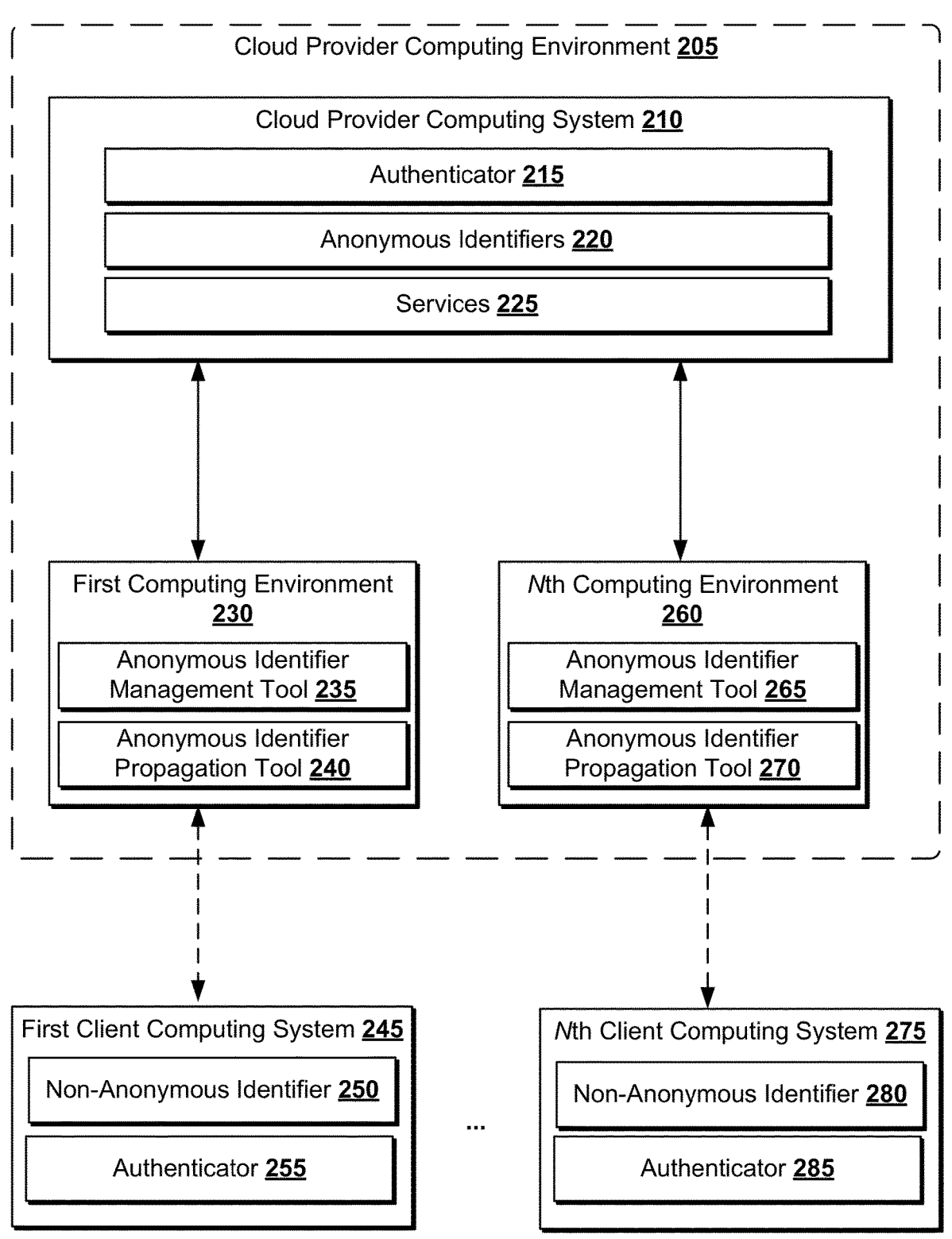
FIG. 2 depicts a block diagram of an example cloud provider computing system for customer-managed identifier rotation and anonymous processing according to example embodiments of the present disclosure.

FIG. 2 depicts an example cloud provider computing environment. For instance, the environment can include cloud provider computing environment 205. The cloud provider computing environment 205 can include cloud provider computing system 210 and a number of additional computing environments. For instance, the number of computing environments can include thousands or millions of computing environments. For purposes of illustration, FIG. 2 includes a depiction of a first computing environment 230 and an Nth computing environment 260. While first computing environment 230 is depicted as being associated with first client computing system 245 and Nth computing environment 260 is depicted as being associated with Nth client computing system 275, it can be understood that a single client computing system can be associated with multiple computing environments.

Cloud service provider computing system 210 can include authenticator 215, anonymous identifiers 220, and services 225. For instance, the cloud provider computing system 210 can use authenticator 215 to authenticate one or more anonymous identifiers to authenticate the anonymous identifier such that a computing environment can be provided access to the proper services 225 based on access granted to the computing environment associated with the respective anonymous identifier.

For instance, a first computing environment 230 can serve as the intermediary between the first client computing system 245 and the cloud provider computing system 210. The first client computing system 245 can be associated with a non-anonymous identifier 250. The first client computing system 245 can include an authenticator 255. The authenticator 255 can be used in connection with the authenticator 215 of cloud provider computing system 210.

The first client computing system 245 can interact with anonymous identifier management tool 235 or anonymous identifier propagation tool 240 to manage anonymous identifier rotation. The anonymous identifier management tool 235 can be used to manage rotation of anonymous identifiers. The anonymous identifier propagation tool 240 can be used to associate the services or permissions that were associated with the first anonymous identifier to be associated with a second, new anonymous identifier. Additionally, the anonymous identifier propagation tool 240 can prevent the non-anonymous identifier 250 from being associated with the anonymous identifier managed by the anonymous identifier management tool 235.

For instance, an Nth computing environment 260 can serve as the intermediary between the Nth client computing system 275 and the cloud provider computing system 210. The Nth client computing system 275 can be associated with a non-anonymous identifier 280. The Nth client computing system 275 can include an authenticator 285. The authenticator 285 can be used in connection with the authenticator 215 of cloud provider computing system 210.

The Nth client computing system 275 can interact with anonymous identifier management tool 265 or anonymous identifier propagation tool 270 to manage anonymous identifier rotation. The anonymous identifier management tool 265 can be used to manage rotation of anonymous identifiers. The anonymous identifier propagation tool 270 can be used to associate the services or permissions that were associated with the first anonymous identifier to be associated with a second, new anonymous identifier. Additionally, the anonymous identifier propagation tool 270 can prevent the non-anonymous identifier 280 from being associated with the anonymous identifier managed by the anonymous identifier management tool 265.

Figure 3:
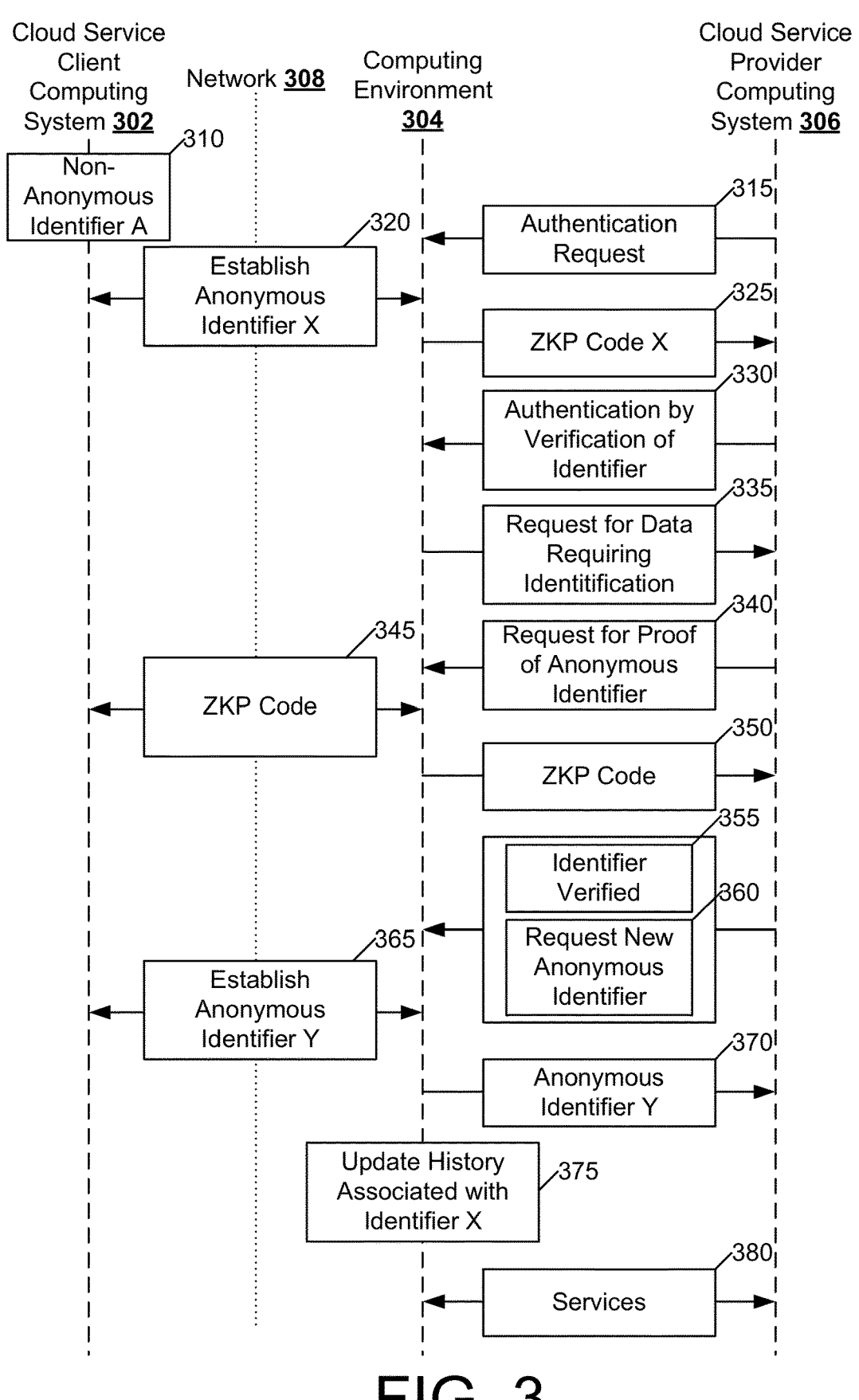
FIG. 3 depicts a swim lane diagram of an example dataflow for customer-managed identifier rotation and anonymous processing in a cloud computing environment according to example embodiments of the present disclosure.

FIG. 3 depicts a swim lane diagram of an example instance of utilizing the methods described herein to rotate anonymous identifiers. This can include performing an authentication protocol to establish an anonymous identifier X, needing to verify the identity of the anonymous identifier X, and then updating to a new anonymous identifier Y. For instance, the swim lane diagram can include a cloud service cloud service client computing system 302 (e.g., corresponding to first client computing system 125, Nth client computing system 145, first client computing system 245, or Nth client computing system 275).

The cloud service client computing system 302 can communicate over network 308 with computing environment 304. Computing environment 304 can be established by a cloud service provider computing system 306 and can be used by the cloud service client computing system 302 to facilitate anonymous communication with the cloud service provider computing system 306.

As depicted in FIG. 3 The cloud service client computing system 302 can be associated with a non-anonymous identifier A 310. Cloud service provider computing system 306 can transmit an authentication request 315 to computing environment 304. Responsive to receiving the authentication request 315, the computing environment 304 can communicate with cloud service client computing system 302 to establish anonymous identifier X 320. Establishing anonymous identifier X 320 can be associated with a zero-knowledge proof code (ZKP Code). The computing environment 304 can transmit a ZKP Code X 325 to the cloud service provider computing system 306. ZKP will be discussed further with regard to operation 404 of FIG. 4.

Responsive to receiving ZKP Code X 325, the cloud service provider computing system 306 can transmit a notification of authentication by verification 330 of the anonymous identifier associated with computing environment 304.

A party associated with cloud service client computing system 302 can initiate a request for access to a service associated with the cloud service provider computing system 306. For instance, the cloud service client computing system 302 can have a subscription for services associated with cloud service provider computing system 306. In order to access the services, the cloud service client computing system 302 can utilize the computing environment 304 to send a request for data requiring identification 335. In response, cloud service provider computing system 306 can transmit a request for proof of anonymous identifier 340.

The computing environment 304 can communicate with cloud service client computing system 302 to retrieve the ZKP Code 345 associated with anonymous identifier X. The ZKP Code 350 can be transmitted to cloud service provider computing system 306 to prove that the anonymous identifier does have an associated with a non-anonymous identifier without revealing the non-anonymous identifier. Responsive to receiving ZKP code 350, the cloud provider computing system can transmit data including a message that the identifier is verified 355 and can request that the computing environment 304 establish a new anonymous identifier 360.

The computing environment 304 can communicate with cloud service client computing system 302 to establish anonymous identifier Y 365. The computing environment 304 can now utilize anonymous identifier Y 370 when interacting with the cloud service provider computing system 306.

Within computing environment 304, an action can be performed to update history associated with identifier X 375. For instance, the computing environment 304 can map historical data associated with identifier X with new identifier Y. Additionally, the computing environment 304 can delete any use of identifier X to prevent an outside party from associating identifier Y with non-anonymous identifier A.

Cloud service client computing system 302 can utilize anonymous identifier Y through computing environment 304 to anonymously access services 380 provided by cloud service provider computing system 306.

FIG. 4 is a flow diagram of an example method 400 to perform customer-managed identifier rotation and anonymous processing in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by the cloud provider computing system (e.g., cloud service provider computing system 306). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, processing logic establishes a computing environment accessible by a second computing system. The computing environment can include an anonymous identifier management tool.

The first computing system can include a cloud service provider and the second computing system includes a cloud service customer. For instance, the cloud service provider can host a cloud platform which renders cloud computing services to a number of cloud service customers. The cloud platform can be a set of hardware and software which is set up by the service provider such that applications can be developed and run by customers and can allow the cloud service providers to process transactions in exchange for providing services.

The service provider can include an organization that provides services. Services can include, for example, communications, storage, processing, and/or banking services. For instance, services can include search services, cloud services, and the like. Services can be intangible, value-added activity provided by a service provider to a customer. Services can be digital services or physical services. The present disclosure can include digital or physical services. Digital services can include, for example, applications or websites.

The second computing system can be one of a large number of computing systems with computing environments. For instance, the number of end-users associated with distinct computing systems can be large enough such that the non-anonymous identifiers associated with the end-users (e.g., and their respective computing systems) cannot be re-identified from anonymous identity-based heuristics. In some instances, this number can be set by a standard-setting organization. Additionally, or alternatively, the number can be set based on a provider's policy. If a number of end-users is below the requisite number needed, the system can generate additional anonymous identifiers to pad the data such that the non-anonymous identifiers retain privacy and risk of being re-identified.

At operation 404, processing logic establishes a first anonymous identifier associated with the second computing system. Processing logic can create the first anonymous identifier. The first anonymous identifier can satisfy one or more rules defined by the first computing system. The first anonymous identifier can include at least one of: (i) alpha-numeric characters, (ii) logographs, (iii) images, (iv) symbols, (v) byte form, or (vi) sound byte form. For instance, a user associated with the second computing system can set an identity through a customer portal. The portal (e.g., cloud console) can manage a number of anonymous identifiers associated with a number of entities, customers, or computing systems. The portal can be managed by the first computing system (e.g., cloud provider computing system) to ensure that no two individuals use the same anonymous identifier or that the anonymous identifiers that are selected, rotated, or used satisfy rules or requirements set by the cloud provider. The anonymous identifier can be unique to a computing system or entity but cannot be linked back to the non-anonymous identifier of the computing system or entity unless there is some mapping between the anonymous identifier and the non-anonymous identifier.

The non-anonymous identifier can be an identifier used to confidently identify an entity or computing system within a pool of entities or computing systems. For example, a social security number, full legal name and credit card, or some other identifier can be used.

An example embodiment can include use in a context of a gaming system. For instance, an individual can download a gaming widget. In order to play an online multiplayer version of the game associated with the widget, the user can set up a user ID. The user ID can be established as part of a setup wizard and can be changed by a user in exchange for something (e.g., a small fee). The system can require that in order to set up the user ID, a zero-knowledge proof (ZKP) must be established that is attached to a non-anonymous identifier (e.g., true identity). The ZKP can be used if there is ever an issue relating to billing, fraud, or some instances where a non-anonymous identifier needs to be used.

The ZKP can be a cryptographic method used by an end-user (e.g., computing system or entity) to prove to a service provider that they are the real owner of anonymous identifier X without revealing any information about the non-anonymous identifier (e.g., true identity) of the end-user.

The widget can be the computing environment that is established by the first computing system. The widget can perform on-device processing to reconcile the true identity against user ID (e.g., anonymous identifier) if it needs to be revealed. After setting up the user ID, the system can no longer identify the non-anonymous identifier, but only the established user ID.

In the example embodiment, an issue could arise with a need to contact the true individual associated with the identifier. The system can send a notification to the user ID. In order to respond, the computing environment can complete the ZKP authentication. The true individual and non-anonymous identifier can be revealed, and the user ID can be changed. The old user ID can be deleted, and the new user ID can be utilized moving forward.

In some instances, a non-anonymous identifier can be needed to reach a resolution. The non-anonymous identifier can be revealed until a resolution is reached and an anonymous identifier can be utilized. This can be performed in such a way that the end-user changes from one anonymous identifier to another without being identified. For example, the ZKP authentication can be used for break glass procedures. And the anonymous identifier can be replaced and/or rotated any time the ZKP authentication is used. In some implementations, the anonymous identifiers can be changed on a scheduled basis (e.g., daily, weekly, every 15 minutes) to provide additional anonymity.

Additional uses of this technology can include on-device processing of biometric data to allow for rotation of passwords and/or password-less or ZKP authentication, anonymous processing of user data to prevent attribution to a particular non-anonymous identifier, using a system anonymously, building management software, travel history, or medical interactions. Each of these can use the same underlying infrastructure of a computing environment established by the provider computing system which is managed by the computing system associated with the user (e.g., client computing system, cloud customer).

For instance, anonymous processing of user data to prevent attribution to a non-anonymous identifier can include the ability for the entity associated with the anonymous identifier to prevent attribution via analytics. However, the system can still determine data associated with the anonymous identifier. The system is unable to associate particular metrics with a particular non-anonymous identifier. Using the system anonymously can allow for compliance with a terms of service indicating the need to rotate the anonymous identifier to satisfy requirements indicated by the end-user (e.g., cloud customer).

Building management software can include a buzzer for a door which can mask a name and address of an addressee but can include an anonym that allows for communication and can be rotated at will with no charge.

Travel history can allow for a non-anonymous identifier to be associated with travel under several anonymous identifiers. As the anonymous identifiers are updated or changed, the computing environment can associate the trips. Every time a new anonymous identifier is utilized, changes in travel history can be updated to be associated with a new anonymous identifier without creating mapping between the first anonymous identifier and a new anonymous identifier.

Medical interactions can allow for managing interactions or transactions between an entity and a clinic, dispensary, medical institution, or medical website. Such that all medical interactions are associated with an anonymous identifier and when the anonymous identifier is updated, all transactions or interactions are updated to be associated with the new anonymous identifier.

The mapping between the anonymous identifier and the non-anonymous identifier can be stored client side for the services used by the customer. For instance, the client side can store the anonymous identifier and non-anonymous identifier for services used by the customer including the ZKP authentication method for each service. For instance, a user can enter a password on a website. The website can use zero-knowledge proofs to verify that the password is associated with the account without revealing the password.

The processing logic can define an authentication method for verifying the first anonymous identifier is associated with the non-anonymous identifier associated with the second computing system. The authentication method can include a zero-knowledge proof. In some instances, the processing logic can use two-factor authentication and/or other security means to ensure that the cloud provider does not know which entity is associated with the computing environment that is established by the cloud provider computing system.

The processing logic can store the first anonymous identifier and the authentication method. The first anonymous identifier and the authentication method can later be used to verify the non-anonymous identifier of the second computing system to the first computing system. The processing logic can automatically generate the first anonymous identifier.

At operation 406, processing logic exchanges message data from the computing environment to the computing system. The message data can be associated with the first anonymous identifier without revealing a non-anonymous identifier associated with the first computing system.

At operation 408, processing logic periodically updates the first anonymous identifier to a second anonymous identifier. For instance, processing logic, can periodically update the first anonymous identifier based on at least one of (i) periodic requirement by the first computing system to change the first anonymous identifier or (ii) in case of events where the second computing system reveals the non-anonymous identifier for a limited period of time until resolution.

At operation 410, processing logic deletes the first anonymous identifier and mapping data indicative of an association between the first anonymous identifier and the second anonymous identifier. For instance, processing logic can propagate the second anonymous identifier forward with instances associated with the first anonymous identifier. The processing logic can delete the first anonymous identifier.

Processing logic can receive a request to provide authentication in exchange for access to a cloud service. Processing logic can provide a zero-knowledge proof code to prove the non-anonymous identifier associated with the second computing system. Processing logic can receive verification of authentication. Processing logic can update the first anonymous identifier based on providing the zero-knowledge proof code to prove the non-anonymous identifier associated with the second computing system.

Figure 5:
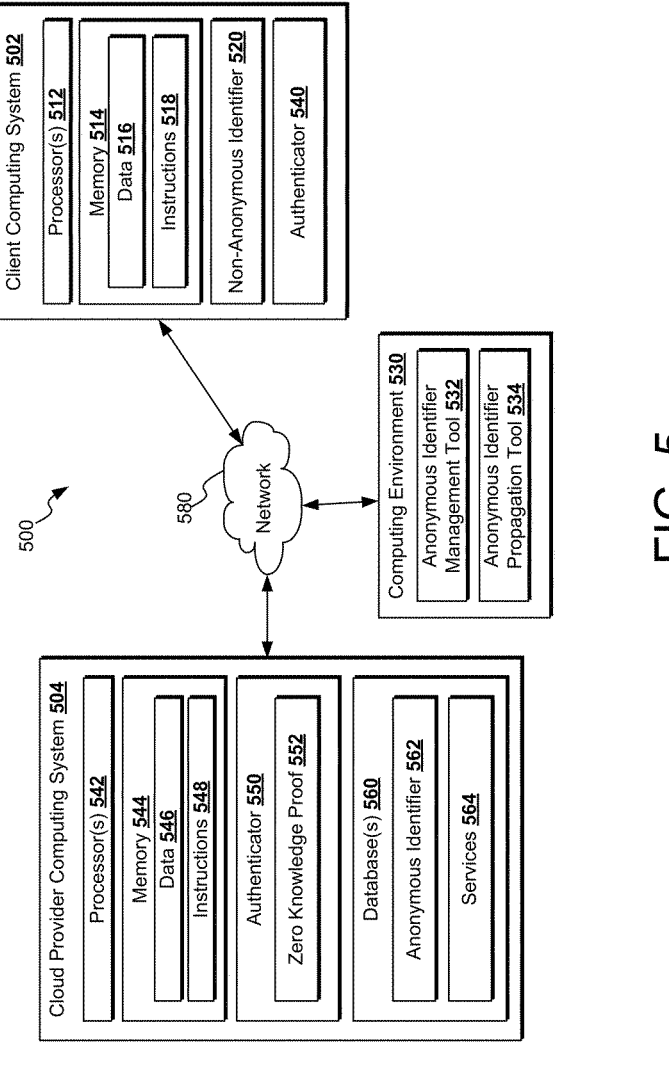
FIG. 5 depicts a block diagram of an example system for customer-managed identifier rotation and anonymous processing according to example embodiments of the present disclosure.

FIG. 5 depicts a block diagram of an example computing system 500 that provides for customer-managed identifier rotation and anonymous processing according to example embodiments of the present disclosure. The computing system 500 includes a client computing system 502, a server computing system 504, and computing environment 530 that are communicatively coupled over a network 580.

The client computing system 502 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing system 502 includes processors 512 and memory 514. The processors 512 can be any suitable processing device (e.g., a processor core, a microprocessor, an ASIC, an FPGA, a controller, a microcontroller, etc.) and can be one processor or a plurality of processors that are operatively connected. The memory 514 can include non-transitory computer-readable storage media, such as RAM, ROM, EEPROM, EPROM, flash memory devices, magnetic disks, etc., and combinations thereof. The memory 514 can store data 516 and instructions 518 which are executed by the processor 512 to cause the client computing system 502 to perform operations.

In some implementations, the client computing system 502 can include non-anonymous identifier 520 and authenticator 540. Non-anonymous identifier 520 can be an identifier associated with an identity of client computing system 502. Authenticator 540 can be used in communication with authenticator 550 to authenticate an anonymous identifier associated with the client computing system 502 and computing environment 530 to server computing system 504. For instance, authenticator 550 can utilize a zero knowledge proof 552 to authenticate an anonymous identifier associated with client computing system 502.

The server computing system 504 includes processors 542 and a memory 544. The processors 542 can be any suitable processing device (e.g., a processor core, a microprocessor, an ASIC, an FPGA, a controller, a microcontroller, etc.) and can be one processor or a plurality of processors that are operatively connected. The memory 544 can include non-transitory computer-readable storage media, such as RAM, ROM, EEPROM, EPROM, flash memory devices, magnetic disks, etc., and combinations thereof. The memory 544 can store data 546 and instructions 548 which are executed by the processor 542 to cause the server computing system 504 to perform operations.

In some implementations, the server computing system 504 includes or is otherwise implemented by server computing devices. In instances in which the server computing system 504 includes plural server computing devices, such server computing devices can operate according to sequential computing architectures, parallel computing architectures, or some combination thereof.

Server computing system 504 can include authenticator 550 and database(s) 560. Authenticator can work with authenticator 540 to perform authentication of anonymous identifiers. Database 560 can include anonymous identifiers 562 and services 564. Anonymous identifiers 562 can include a number of anonymous identifiers from a number of computing environments including computing environment 530.

Computing environment 530 can include anonymous identifier management tool 532 and anonymous identifier propagation tool 534. Anonymous identifier management tool 532 can be accessed by client computing system 502 over network 580 to establish anonymous identifiers. The anonymous identifiers can be used to access services 564 from server computing system 504. Computing environment 530 can include anonymous identifier propagation tool 534 can be used to propagate a new anonymous identifier forward and delete any association between the new anonymous identifier and a previous anonymous identifier.

Server computing system 504 can store associations between anonymous identifiers 562 and services 564 that are accessible to the respective anonymous identifiers 562.

In some implementations, the client computing system 502, server computing system 504, or computing environment 530 can store or include one or more models. For example, the models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more models can be received by the server computing system 504 over the network 580, stored in the memory of a respective computing system (e.g., memory 514, 544), and then used or otherwise implemented by one or more processors of the respective computing systems (e.g., processors 512, 542). In some implementations, the respective computing systems can implement multiple parallel instances of a single model.

More particularly, models can be used to automate steps of logic processing discussed in FIG. 4. For instance, machine learning models can be used to improve malicious domain monitoring, generating requests for domain monitoring, improved determination of risk scores for domains and IP addresses, performing take down actions, or any other functions.

Additionally, or alternatively, one or more models can be included in or otherwise stored and implemented by the server computing system 504 that communicates with the client computing system 502 according to a client-server relationship. For example, the models can be implemented by the server computing system 504 as a portion of a web service (e.g., a domain monitoring service, a security operations center service, a cybersecurity service). Thus, one or more models can be stored and implemented at the client computing system 502 or one or more models can be stored and implemented at the server computing system 504.

The client computing system 502, server computing system 504, or computing environment 530 can train the models via interaction with a training computing system (not pictured) that is communicatively coupled over the network 580. The training computing system can be separate from the server computing system 504 or can be a portion of the server computing system 504.

The training computing system includes one or more processors and a memory. The one or more processors can be any suitable processing device (e.g., a processor core, a microprocessor, an ASIC, an FPGA, a controller, a microcontroller, etc.) and can be one processor or a plurality of processors that are operatively connected. The memory can include one or more non-transitory computer-readable storage media, such as RAM, ROM, EEPROM, EPROM, flash memory devices, magnetic disks, etc., and combinations thereof. The memory can store data and instructions which are executed by the processor to cause the training computing system to perform operations. In some implementations, the training computing system includes or is otherwise implemented by one or more server computing devices.

The training computing system can include a model trainer that trains the machine-learned models stored at the client computing system 502, the server computing system 504, or the computing environment 530 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer can perform a number of generalization techniques (e.g., weight decays, dropouts, etc.) to improve the generalization capability of the models being trained.

In particular, the model trainer can train the models based on a set of training data. Training data can include, previously taken down malicious domain, historically determined risk scores, historically determined malicious domains, historically determined IP address risk scores, or other related training data.

In some implementations, if the user has provided consent, the training examples can be provided by the user computing device. Thus, in such implementations, the model provided to the client computing system 502 can be trained by the training computing system on user-specific data received from the client computing system 502. In some instances, this process can be referred to as personalizing the model.

The model trainer includes computer logic utilized to provide desired functionality. The model trainer can be implemented in hardware, firmware, and/or software controlling a general purpose processor. For example, in some implementations, the model trainer includes program files stored on a storage device, loaded into a memory and executed by one or more processors. In other implementations, the model trainer includes one or more sets of computer-executable instructions that are stored in a tangible computer-readable storage medium such as RAM, hard disk, or optical or magnetic media.

The network 580 can be any type of communications network, such as a local area network (e.g., intranet), wide area network (e.g., Internet), or some combination thereof and can include any number of wired or wireless links. In general, communication over the network 580 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computing system comprising:
one or more processors; and
   one or more computer-readable media storing instructions that are executable to cause the one or more processors to perform operations, the operations comprising:
   establishing, by the computing system, a computing environment accessible by a second computing system, the computing environment comprising an anonymous identifier management tool, wherein the computing system comprises a cloud service provider and the second computing system comprises a cloud service customer;
   establishing, by the anonymous identifier management tool, a first anonymous identifier associated with the second computing system;
   exchanging message data from the computing environment to the computing system, wherein the message data is associated with the first anonymous identifier without revealing a non-anonymous identifier associated with the second computing system;

periodically updating, by the anonymous identifier management tool, the first anonymous identifier to a second anonymous identifier;

deleting, by the anonymous identifier management tool, the first anonymous identifier and mapping data indicative of an association between the first anonymous identifier and the second anonymous identifier;

receiving, by the second computing system, a request to provide authentication in exchange for access to a cloud service;

providing, by the second computing system, a zero-knowledge proof code to prove the non-anonymous identifier associated with the second computing system;

receiving, by the second computing system, verification of authentication; and updating, by the second computing system, the first anonymous identifier based on providing the zero-knowledge proof code to prove the non-anonymous identifier associated with the second computing system.

2. The computing system of claim 1, the operations comprising:

propagating, by the second computing system within the computing environment, the second anonymous identifier forward with instances associated with the first anonymous identifier; and deleting, by the second computing system within the computing environment, the first anonymous identifier.

3. The computing system of claim 1, wherein establishing, by the anonymous identifier management tool, the first anonymous identifier associated with the second computing system comprises:

creating, on the second computing system, the first anonymous identifier, wherein the first anonymous identifier satisfies one or more rules defined by the computing system;

defining an authentication method for verifying the first anonymous identifier is associated with the non-anonymous identifier associated with the second computing system; and storing by the second computing system, the first anonymous identifier and the authentication method, wherein the first anonymous identifier and the authentication method can later be used to verify the non-anonymous identifier of the second computing system to the computing system.

4. The computing system of claim 3, wherein the authentication method comprises a zero-knowledge proof.

5. The computing system of claim 1, wherein updating, by the anonymous identifier management tool, the first anonymous identifier associated with the second computing system is performed based on at least one of: (i) periodic requirement by the computing system to change the first anonymous identifier or (ii) in case of events where the second computing system reveals the non-anonymous identifier for a limited period of time until resolution.

6. The computing system of claim 1, wherein the first anonymous identifier comprises at least one of: (i) alphanumeric characters, (ii) logographs, (iii) images, or (iv) symbols.

7. The computing system of claim 1, wherein establishing the first anonymous identifier associated with the second computing system comprises automatically generating the first anonymous identifier.

8. A computer-implemented method, comprising:

establishing, by a first computing system, a computing environment accessible by a second computing system, the computing environment comprising an anonymous identifier management tool;

establishing, by the anonymous identifier management tool, a first anonymous identifier associated with the second computing system, wherein the first computing system comprises a cloud service provider and the second computing system comprises a cloud service customer;

exchanging message data from the computing environment to the first computing system, wherein the message data is associated with the first anonymous identifier without revealing a non-anonymous identifier associated with the first computing system;

periodically updating, by the anonymous identifier management tool, the first anonymous identifier to a second anonymous identifier;

deleting, by the anonymous identifier management tool, the first anonymous identifier and mapping data indicative of an association between the first anonymous identifier and the second anonymous identifier;

receiving, by the second computing system, a request to provide authentication in exchange for access to a cloud service;

providing, by the second computing system, a zero-knowledge proof code to prove the non-anonymous identifier associated with the second computing system;

receiving, by the second computing system, verification of authentication; and updating, by the second computing system, the first anonymous identifier responsive to providing the zero-knowledge proof code to prove the non-anonymous identifier associated with the second computing system.

9. The computer-implemented method of claim 8, comprising:

propagating, by the second computing system within the computing environment, the second anonymous identifier forward with instances associated with the first anonymous identifier; and deleting, by the second computing system within the computing environment, the first anonymous identifier.

10. The computer-implemented method of claim 8, wherein establishing, by the anonymous identifier management tool, the first anonymous identifier associated with the second computing system comprises:

creating, on the second computing system, the first anonymous identifier, wherein the first anonymous identifier satisfies one or more rules defined by the first computing system;

defining an authentication method for verifying the first anonymous identifier is associated with the non-anonymous identifier associated with the second computing system; and storing by the second computing system, the first anonymous identifier and the authentication method, wherein the first anonymous identifier and the authentication method can later be used to verify the non-anonymous identifier of the second computing system to the first computing system.

11. The computer-implemented method of claim 10, wherein the authentication method comprises a zero-knowledge proof.

12. The computer-implemented method of claim 8, wherein updating, by the anonymous identifier management tool, the first anonymous identifier associated with the second computing system is performed based on at least one of: (i) periodic requirement by the first computing system to change the first anonymous identifier or (ii) in case of events where the second computing system reveals the non-anonymous identifier for a limited period of time until resolution.

13. The computer-implemented method of claim 8, wherein the first anonymous identifier comprises at least one of (i) alpha-numeric characters, (ii) logographs, (iii) images, or (iv) symbols.

14. The computer-implemented method of claim 8, wherein establishing the first anonymous identifier associated with the second computing system comprises automatically generating the first anonymous identifier.

15. One or more non-transitory computer-readable media storing instructions that are executable by one or more processors to perform operations comprising:

establishing, by a first computing system, a computing environment accessible by a second computing system, the computing environment comprising an anonymous identifier management tool, wherein the first computing system comprises a cloud service provider and the second computing system comprises a cloud service customer;

establishing, by the anonymous identifier management tool, a first anonymous identifier associated with the second computing system;

exchanging message data from the computing environment to the first computing system, wherein the message data is associated with the first anonymous identifier without revealing a non-anonymous identifier associated with the first computing system;

periodically updating, by the anonymous identifier management tool, the first anonymous identifier to a second anonymous identifier;

deleting, by the anonymous identifier management tool, the first anonymous identifier and mapping data indicative of an association between the first anonymous identifier and the second anonymous identifier;

receiving, by the second computing system, a request to provide authentication in exchange for access to a cloud service;

providing, by the second computing system, a zero-knowledge proof code to prove the non-anonymous identifier associated with the second computing system;

receiving, by the second computing system, verification of authentication; and updating, by the second computing system, the first anonymous identifier responsive to providing the zero-knowledge proof code to prove the non-anonymous identifier associated with the second computing system.

* * * * *